United States Patent

[11] 3,568,088

| [72] | Inventor | Benjamin Dessus<br>Paris, France |
| --- | --- | --- |
| [21] | Appl. No. | 713,676 |
| [22] | Filed | Mar. 18, 1968 |
| [45] | Patented | Mar. 2, 1971 |
| [73] | Assignee | Compagnie Generale D'Electricite<br>Paris, France |
| [32] | Priority | Mar. 31, 1967 |
| [33] | | France |
| [31] | | 101126 |

[54] LASER WITH IMPROVED POWER AND FREQUENCY STABILITY
4 Claims, 1 Drawing Fig.

[52] U.S. Cl. ............................................. 331/94.5,
350/161, 350/269, 356/106
[51] Int. Cl. ......................................... H01s 3/10
[50] Field of Search ............................... 331/94.5; -
356/106(RL); 350/161, 266, 269, 288

[56] References Cited
UNITED STATES PATENTS
3,311,846  3/1967  Simpson et al............... 331/94.5

OTHER REFERENCES
Rabinowitz et al., The Optically Pumped Cesium Laser. Quantum Electronics proceedings of the third international congress; edited by Grivet and Bloembergen; Columbia University Press, New York (1964) pp 491—493.

*Primary Examiner*—William L. Sikes
*Attorney*—Sughrue, Rothwell, Mion, Zinn & Macpeak ABSTRACT: In a laser consisting of a quartz laser tube closed at the anode end by a mirror normal to the tube axis and at the cathode end by a glass plate having parallel faces and defining with the axis of the tube an angle equal to the Brewster angle, a second mirror disposed normal to the axis of the tube at the cathode end and fixed thereto by a sleeve fitted to the quartz tube.

PATENTED MAR 2 1971 3,568,088
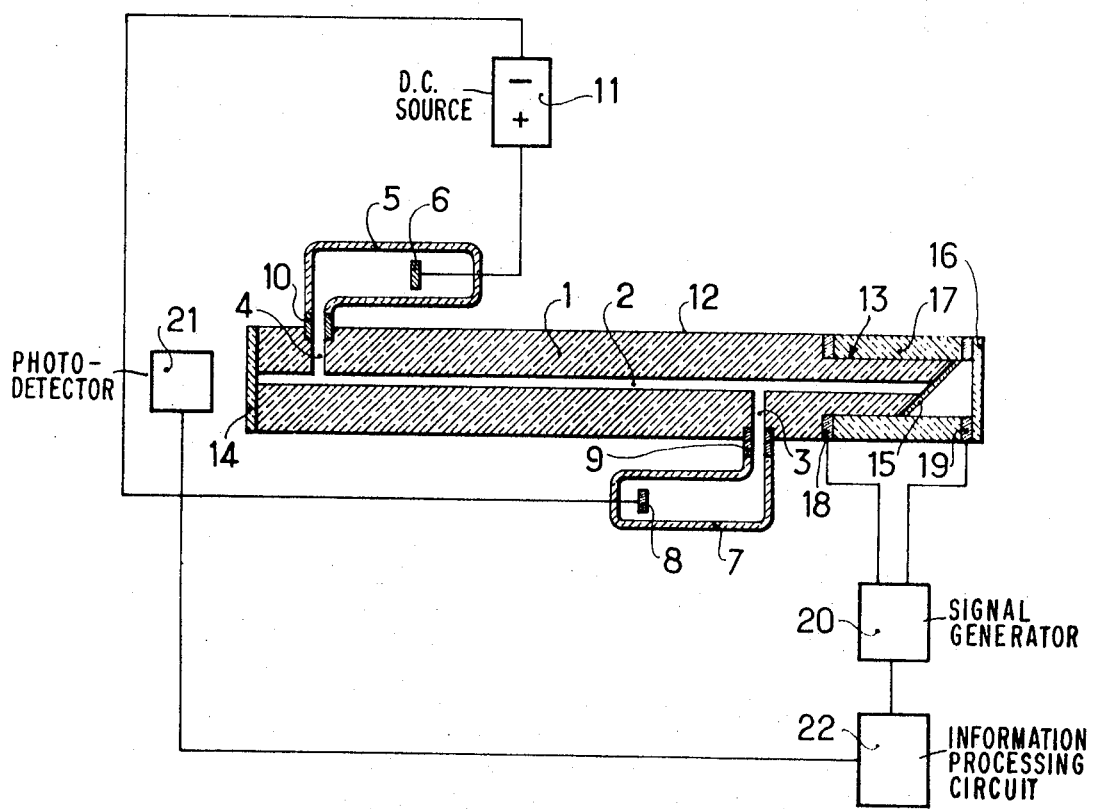

LASER WITH IMPROVED POWER AND FREQUENCY STABILITY

There is commonly employed in gas lasers, a resonating cavity formed of two mirrors, between which there is disposed a closed tube provided with electrodes with an electric discharge occurring between the electrodes and within the gas carried by the tube. The extreme faces of the closed tube are cut to conform to the Brewster angle in order to minimize the losses due to reflection on the mirror faces, as well as to ensure polarization rectilinearly of the laser beam leaving the tube.

It is very difficult with such a structure to obtain high frequency stability because the least variation in the length of the cavity as defined by the two mirrors results in an appreciable variation in frequency. The variation in the length of the cavity may result, for example, from vibration. Moreover, any misalignment of the mirrors brings about an appreciable variation in the power of the laser. Since the mirrors and the laser tube are separate, the stability of the laser is affected by the environmental properties of the air which may readily vary, such as humidity, turbulence, dust, etc. Where it is desired to employ a laser as a frequency standard, the operation is centered on a single frequency which entails the use of the shortest possible cavity and this requires a correspondingly high precision in the adjustment of the distance between the mirrors and the maintenance of the same.

It is, therefore, a primary object of the present invention to avoid the aforementioned disadvantages while providing a gas laser which has both natural frequency and power stability.

In general, the gas laser of the present invention comprises a quartz laser tube, including an anode and cathode, and is closed at the anode end by a mirror which is normal to the axis of the tube. That end of the tube which is closer to the cathode is cut to the Brewster angle for the transmitted wave length, this end being closed by a glass plate having parallel faces. A second semitransparent mirror is secured to the laser, parallel to the first mirror and at the end of a sleeve which is, in turn, secured to the laser tube at the cathode end. The space between the glass plate and the second mirror is substantially isolated from the medium surrounding the laser with the assembly formed by the tube and the mirrors comprising a single, rigid structure.

Another important feature of the invention resides in the fact that the sleeve supporting the second mirror may be formed of a piezoelectric material which, when excited by an electric current, corrects the length of the cavity formed by the two mirrors to obtain a laser beam of stable power and frequency.

Further, the glass plate which closes the end of the laser tube closest to the cathode, may be of a glass which absorbs an undesirable wave length of the laser beam. For instance, in the case of a helium-neon laser, an S 80151 glass may be employed, which has considerable absorption of the wavelength 3.39 $\mu$ but allows the wavelength 6,328 A. units to pass. The glass plate positioned in the Brewster incidence also has the advantage of protecting a second mirror from ionic bombardment by the ions of the gas created by the electric discharge between the anode and the cathode and of rectilinearly polarizing the laser beam, which characteristic is often advantageously employed in optical measurement. The rigid laser structure thus obtained also has the advantage that it can be readily manipulated without the characteristics of the laser being affected.

Other objects of the invention will be pointed out in the following detailed description and claims and illustrated in the accompanying drawing which discloses, by way of example, the principle of this invention and the best mode which has been contemplated of applying that principle.

In the drawing:

The single FIGURE is a sectional, partial schematic view of the integral laser structure of the present invention.

Referring to the drawing, the laser comprises a quartz tube 1 which carries a central channel tube which is preferably of small diameter, very fine, in the form of a capillary. Two transverse channels 3 and 4 intersect the longitudinal central channel 2 at cathode and anode ends, respectively. Two external tubes 5 and 7 are coupled to channels 3 and 4, respectively, and carry, respectively, electrodes 6 and 8. The auxiliary, external tubes 5 and 7 are coupled to quartz tube 1 by connecting devices 9 and 10, or alternatively, may be sealed to tube 1. The electrodes 6 and 8 are connected to a supply source 11, which consists, for example, of a direct current source. The quartz tube 1 includes along its major length, a thick portion 12, to which is joined a reduced diameter or thinner portion 13. The quartz tube 1 is closed at one end by a mirror 14 which is normal to the axis defined by channel 1, while the other end is closed by a glass plate 15 having parallel faces and makes with the axis of the channel an angle equal to the Brewster angle. As hereinbefore specified, the plate 15 may be employed as a polarizer or a filter corresponding to the particular glass chosen. A sleeve 17 surrounds the thinner portion 13 of tube 1 and is thus coupled to the quartz tube. The sleeve is made of piezoelectric material, for example, a piezoelectric ceramic and includes metal plates 18 and 19 which are connected, respectively, to the output terminals of an electric signal generator 20. The sleeve 17 is also provided with a mirror 16 which is fixed to the sleeve and disposed normally to the axis of channel 2.

The resonating cavity formed by tube 1, the sleeve 17 and the mirrors 14 and 16 thus constitutes a rigid structure which can undergo vibrations or manipulations without any danger of varying the length of the cavity. The laser, according to the present invention, also includes a photodetector 21 which is disposed behind the mirror 14 and is operatively coupled to an information-processing circuit indicated by block 22 which controls the signal generator 20.

The laser, according to the present invention, operates as follows:

It is known that the output power of a laser is a function of its oscillation frequency and this characteristic may be utilized to stabilize the laser. For this purpose, the length of the cavity is modulated, for example, to a frequency of 5 kc./sec. with the aid of a piezoelectric transducer in the form of sleeve 17 of piezoelectric ceramic and electrodes 18 and 19. Energization of the transducer results in a variation of the length of the cavity and hence, in a weak modulation of the output power. The weak laser transmission which passes through mirror 14 is collected by the photodetector 21 and the signal thus obtained, after processing by circuit 22 (synchronous detection), governs the length of the cavity formed by mirrors 14 and 16. The circuit 22 serves to process the information transmitted by the photodetector 21 and controls the generator 11 which energizes the transducer (piezoelectric transducer sleeve 17 and electrodes 18 and 19) so as to compensate for variations in the length of the cavity due to the expansions of the quartz tube 1 and the sleeve 17. On the other hand, the energization of the transducer by a frequency of 5 kc./sec. permits modulation of the output power of the laser. This modulation produces a frequency swing of the laser to a maximum value on the order of 2.5 kc./sec. around the central frequency, which thus imparts excellent frequency stability to the laser beam emitted by the structure in accordance with the invention.

While the invention has been particularly shown and described with reference to preferred embodiment, it will be understood by those skilled in the art that the foregoing and other changes in form and details may be made therein without departing from the spirit and scope of the invention.

I claim:

1. In a laser comprising a quartz tube having a longitudinally extending central channel, a pair of spaced transverse channels intersecting said longitudinal channel, auxiliary closed tubes coupled respectively thereto, each of the said closed tubes carrying an electrode therein, a mirror closing off one end of said longitudinal channel and positioned at right angles thereto and a glass plate having parallel faces closing off the other end of said longitudinal channel and defining with said channel an angle equal to the Brewster angle, the improvement comprising: a second mirror and a sleeve formed of a piezoelectric ceramic material fitted to the glass plate end of said quartz tubes for supporting said second mirror normally to said longitudinal channel on the side of said glass plate opposite said first mirror and spaced axially from said glass plate, an electric signal generator and means operatively connecting said piezoelectric material to said electric signal generator.

2. The laser as claimed in claim 1 wherein the end of said quartz tube carrying said sleeve is of reduced diameter to receive said sleeve, and said laser further includes means for hermetically sealing said sleeve to said mirror and to said quartz tube to insulate said glass plate from the surrounding medium.

3. The laser as claimed in claim 1 wherein one of said mirrors has a transmission capacity other than zero and said laser further includes; a photodetector disposed on the outside of said mirror having a transmission capacity other than zero and means for operatively coupling said electric signal generator to said photodetector.

4. The laser as claimed in claim 3 further including an information-processing circuit operatively coupled to said photodetector such that the electric signal generator emits signals having a frequency on the order of several kc./sec. and an amplitude determined by the signals emitted by said photodetector.